United States Patent [19]
Haraguchi et al.

[11] Patent Number: 6,074,433
[45] Date of Patent: *Jun. 13, 2000

[54] OPTIMIZATION CONTROL APPARATUS AND OPTIMIZATION CONTROL METHOD FOR ARRAY DESCRIPTIONS

[75] Inventors: Masatoshi Haraguchi, Kawasaki; Masanori Kira, Shizuoka; KohIchiro Hotta, Kawasaki, all of Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/703,063

[22] Filed: Aug. 26, 1996

[30] Foreign Application Priority Data

Aug. 25, 1995 [JP] Japan ..................................... 7-217144

[51] Int. Cl.[7] .................................................. G06F 9/445
[52] U.S. Cl. .......................... 717/9; 717/5; 717/6; 717/7; 717/8; 717/10; 717/11
[58] Field of Search ..................................... 395/705, 707, 395/709, 706, 708; 717/10, 11

[56] References Cited

U.S. PATENT DOCUMENTS

| | | | |
|---|---|---|---|
| 4,773,007 | 9/1988 | Kanada et al. | 395/709 |
| 4,807,126 | 2/1989 | Gotou et al. | 395/709 |
| 5,151,991 | 9/1992 | Iwasawa et al. | 395/700 |
| 5,293,631 | 3/1994 | Rau et al. | 395/700 |
| 5,303,357 | 4/1994 | Inoue et al. | 395/709 |
| 5,396,631 | 3/1995 | Hayashi et al. | 395/707 |
| 5,606,697 | 2/1997 | Ono | 395/707 |
| 5,640,568 | 6/1997 | Komatsu | 395/705 |
| 5,852,734 | 12/1998 | Komatsu et al. | 395/707 |
| 5,901,318 | 5/1999 | Hsu | 395/709 |
| 5,953,531 | 9/1999 | Megiddo et al. | 395/709 |
| 5,958,048 | 9/1999 | Babaian et al. | 712/241 |
| 5,960,171 | 9/1999 | Rotman et al. | 714/49 |
| 5,987,254 | 11/1999 | Subrahmanyam | 395/705 |
| 6,016,397 | 1/2000 | Ogasawara et al. | 395/706 |
| 6,026,226 | 2/2000 | Heile et al. | 395/500.13 |

OTHER PUBLICATIONS

Cann et al., "Advanced Array Optimizations for High Performance Functional Languages", IEEE, pp. 229–239, Mar. 1995.

Choudhary et al., "Compiling Fortran 77D and 90D for MIMD Distributed–Memory Machines", IEEE, pp. 4–11, Oct. 1992.

Albert et al., "Compiling Fortran 8x array features for the connection machine computer system", ACM, pp. 42–56, Jul. 1988.

Delores M. Etter, An Evaluation of the New Fortran 90 Standard Relative to DSP Algorithm Implementations,1993 IEEE,I8–11, Apr. 1993.

Aho et al., "Compilers Princilples, Techniques, and Tools" , Addision–Wesley Publishing, pp 10–11, 201–203, Mar. 1988.

Kyoko Iwasawa, "Optimizing Method Of Array Description In Fortran 90", Transactions of the Institute of Electronics, Information and Communication Engineers, pp 504–506, May 1995.

Primary Examiner—Tariq R. Hafiz
Assistant Examiner—Ted T. Vo
Attorney, Agent, or Firm—Staas & Halsey

[57] ABSTRACT

In order to generate optimum codes for array descriptions having a new language specification, an optimization control apparatus or method for array description executes a function of determining a scope of executing optimization for the array descriptions on the basis of an optimization level determined in advance, the dimension number of an array of the array descriptions, and the array number of each dimension; a function of extracting information representing the respective forms of the array descriptions within the scope of executing the optimization; a function of detecting a common expression for each array description and recognizing information common to each array description; and a function of executing a loop merge determination process as to whether or not a loop merge for converting each array description to an optimum loop is to be carried out, for each array description whose form is defined during the generation of the optimum codes.

7 Claims, 11 Drawing Sheets

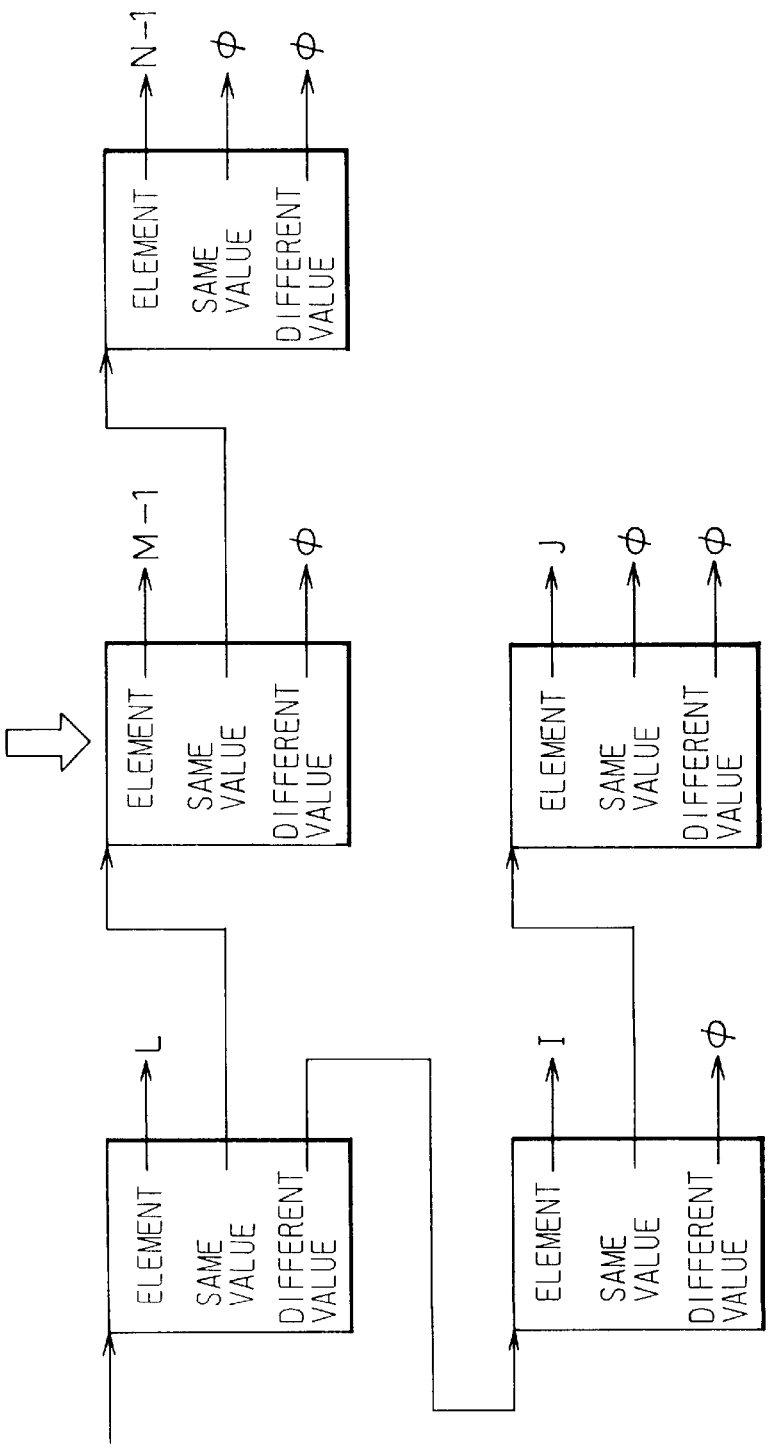

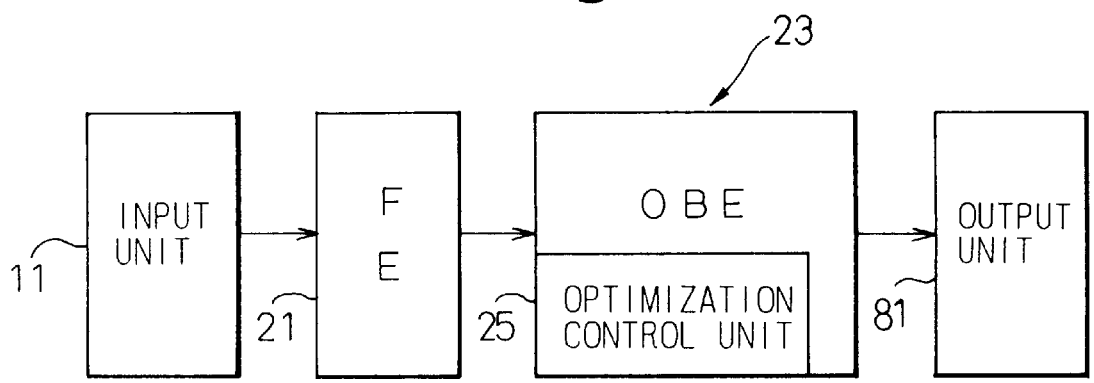

OPTIMIZATION CONTROL APPARATUS AND OPTIMIZATION CONTROL METHOD FOR ARRAY DESCRIPTIONS

BACKGROUND OF THE INVENTION

1. Field of the Invention

This invention relates to an optimization control apparatus and an optimization control method for array descriptions which promote the generation of more appropriate codes for new array descriptions added as a new language specification such as FORTRAN 90 stipulated by JIS X 3001 [X3.198 according to ANSI (American National Standards of Institute), and also ISO/IEC 1539:1991]. In those machines which do not have a vector processor such as a computer system, the new array descriptions described above are expanded into one or a plurality of loops inside a compiler for converting a text (generally called a "source text") as an input, such as a source program, to an object program (program in a machine language). Because the portion of the loops in the object program occupies a large proportion in the execution time, the generation of codes associated with the array descriptions under the optimum state greatly contributes to a reduction of the execution time. The present invention deals with one measure for accomplishing the reduction of the execution time, with regard to the new array descriptions added to the original array descriptions as a language specification which must be established for versatile utilization in various fields.

It has been confirmed that the present invention is effective for not only FORTRAN 90 described above but also for all the languages having a language specification for which a given array description is possible, and this suggests a versatile utility of the optimization control apparatus and the optimization control method of the present invention.

2. Description of the Related Art

The below-mentioned Expression No. 1 represents an example of conventional array descriptions comprising a plurality of statements (expressions) such as an array assignment statement operating an array of text. In the case of the array descriptions which are added, as a new language specification, from FORTRAN 90, for example, operations for the array and the array assignments can be described without using a loop control statement such as a DO statement, as shown in the right-hand portion of the following Expression No. 1:

---
Expression No. 1
---
| Initialization of Array A using DO statement | Initialization of Array A using array description |
|---|---|
| ↓ | ↓ |
| REAL(KIND=4)::A(10) | REAL(KIND=4)::A(10) |
| DO I = 1, 10 | |
| A(I) = 1 | A = 1 |
| ENDDO | |
| END | |

As described above, the array descriptions are converted to the loop (or loops) and are executed inside the compiler. If conversion of the array descriptions to the loop is carried out statement by statement at this time, execution performance is very low. Therefore, an optimization control referred to as a "loop merge" is generally executed. In other words, as shown in the right-hand portion of the following Expression No. 2, the array descriptions which can be executed by the same loop (the left-hand portion of Expression No. 2) are gathered and by doing so, the specific portion of the array descriptions can be converted so that it can be executed by the same loop:

---
Expression No. 2
---

REAL(KIND = 4)::A(10), B(10)
A = 1
B = 2
END

| when loop merge is not executed | when loop merge is executed |
|---|---|
| ↓ | ↓ | expanded image of array descriptions
↓                                    ↓

| REAL(KIND=4)::A(10), B(10) | REAL(KIND=4)::A(10), B(10) |
| DO I = 1, 10 | DO I = 1, 10 |
| A(I) = 1 | A(I) = 1 |
| ENDDO | B(I) = 2 |
| DO I = 1, 10 | ENDDO |
| B(I) = 2 | END |
| ENDDO | |
| END | |

However, an optimization control means according to the prior art cannot execute a loop merge for the array descriptions whose subscript expressions representing the respective forms are different from each other, because the forms of the array descriptions are regarded as unequal to each other, as expressed by the following Expression No. 3:

---
Expression No. 3
Array description for which loop merge cannot be executed by optimization control of the prior art because subscript expressions representing forms are different from each other
↓
REAL(KIND = 4)::A(10), B(10), C(10)
---
| A(1:L) = B(2:M) | ... (1) |
| B(2:M) = C(3:N) | ... (2) |
| C(3:N) = A(1:K) | ... (3) |

In order to accomplish a loop merge in the array descriptions according to the optimization control means of the prior art, the forms of the array descriptions must be completely coincident with each other. In other words, the optimization control means according to the prior art can execute a loop merge for only those array descriptions whose forms can be judged as coincident with each other as represented by Expression No. 2 given above. When the form of the loop is defined at the time of execution and the generation of the optimum codes is required by calculation expressions having different forms, the conventional means cannot execute the loop merge.

On the other hand, the conventional optimization control means controls the optimization level by an option. However, whereas there are many cases in which the translation resources required for optimization depend on complicatedness of the source used as the input, this information concerning the complicatedness of the source is not used for controlling the optimization level of the compiler and hence, the translation resources are not effectively utilized.

SUMMARY OF THE INVENTION

In view of the problems of the prior art described above, it is the first object of the present invention to provide an optimization control apparatus and an optimization control method for array descriptions which can solve the problem of a loop merge process in the case in which a conventional loop merge process cannot judge a coincidence of the forms of the array descriptions.

It is the second object of the present invention to provide an optimization control apparatus and an optimization control method for array descriptions which can reduce the execution time depending on loop expansion of the array descriptions inclusive of the loop merge process much more than in the conventional means.

When a text used as an input is read and optimum codes are generated for a plurality of array descriptions comprising statements operating an array of the text, the objects of the present invention described above can be accomplished by an optimization control apparatus which comprises a means for determining a scope of executing an optimization for the array descriptions on the basis of an optimization level determined in advance, the dimension number of an array of the array descriptions, and the array number of each dimension, wherein the optimum codes are outputted within the scope of executing the optimization judged by the means for determining the scope of executing the optimization.

Preferably, the optimization control apparatus according to the present invention further comprises a means for extracting information about an array descriptive form for extracting the information representing each form of the array descriptions within the scope of executing the optimization.

Preferably, further, the optimization control apparatus according to the present invention further comprises a common expression recognizing means for detecting a common expression for each of the array descriptions from the information stored in the list form, and recognizing the information common to each of the array descriptions.

Preferably, further, the optimization control apparatus according to the present invention executes a loop merge process which determines whether or not a loop merge for converting the array descriptions to an optimum loop should be carried out, for the array descriptions whose forms are defined at the time of execution during the generation of the optimum codes, on the basis of the results detected by the common expression recognizing means.

Further preferably, in the optimization control apparatus according to the present invention, when the array descriptions are converted to the loop, an optimum loop form is selected from the information stored in the list form.

On the other hand, when a text as an input is read and optimum codes for a plurality of array descriptions consisting of statements operating the array of the text are generated, an optimization control method for array descriptions according to the present invention comprises a step of determining the scope of executing an optimization of the array descriptions on the basis of an optimization level determined in advance, the dimension number of an array of the array descriptions, and the array number of each dimension, wherein the optimum codes are outputted within the scope of executing the optimization judged by this step.

Preferably, the optimization control method for array description according to the present invention further comprises a step of extracting the information representing each form of the array descriptions within the scope of executing the optimization, wherein the information extracted by the step is stored in a list form.

Preferably, further, the optimization control method for array description according to the present invention further comprises a step of detecting a common expression for each of the array descriptions from the information stored in the list form, and recognizing the information common to each of the array descriptions.

Preferably, further, the optimization control method for array description according to the present invention further comprises a step of executing a loop merge determination process which determines whether or not a loop merge for converting the array descriptions to an optimum loop should be carried out for the array description whose forms are defined at the time of execution during the generation of the optimum codes, on the basis of the detection results of the common expression.

Preferably, further, the optimization control method for array description according to the present invention further comprises the step of selecting an optimum loop form from the information stored in the list form when the array descriptions are converted to a loop.

The explanation will be given in further detail. The optimization control means for array description according to the present invention utilizes the rule that data elements as the object of operations of the array descriptions comprising a new language specification such as FORTRAN 90, etc., must have the forms which are matched with each other between the left side and the right side of each array description when the form of the loop is determined, and expands the range in which the form coincidence can be recognized. In this way, the optimization control means according to the present invention can execute a loop merge, even in the case in which the conventional means cannot execute a loop merge as in the case represented by the afore-mentioned Expression No. 3.

In addition, the optimization control means for array description according to the present invention dynamically determines the scope of executing the optimization on the basis of the optimization level, the dimension number of the array descriptions and the array number of each dimension (that is, complicatedness of the expressions) in consideration of the load and the effect of the loop merge process. According to such a process and such a technique, a translation work area, the translation time and the execution time corresponding to the optimization level can be accomplished.

In order to represent in a more simplified form the form of the loop after loop expansion (the initial value and the end value of the number of rotations of the loop, etc.), the optimization control means for array descriptions according to the present invention selects the expression capable of expressing the loop form in a more simplified form from among the subscript expressions used also for the determination of a loop merge. The optimum loop expansion of the array descriptions depending on the optimization level can be accomplished by the above-mentioned process.

In short, the optimization control means for array descriptions according to the present invention enlarges the scope in which the form coincidence can be recognized at the time of determination of the form of the loop, and dynamically determines the scope of executing the optimization on the basis of the optimization level and complicatedness of the expressions in consideration of the load and the effect of the loop merge process. Therefore, the optimization control means of the present invention can accomplish the translation work area, the translation time, and the execution time corresponding to the optimization level, without wasting the translation resources and making the expressions in the array descriptions complicated.

BRIEF DESCRIPTION OF THE DRAWINGS

The above objects and features of the present invention will be more apparent from the following description of the preferred embodiments with reference to the accompanying drawings, wherein:

FIG. 10 is a diagram showing an example of the list structure made by a source text input; and FIG. 11 is a block diagram showing a concrete example for accomplishing the optimization control according to the present invention.

DESCRIPTION OF THE PREFERRED EMBODIMENTS

Hereinafter, embodiments for accomplishing optimization control of array descriptions according to the present invention will be explained with reference to FIGS. 1 to 11 of the accompanying drawings.

Figure 1:
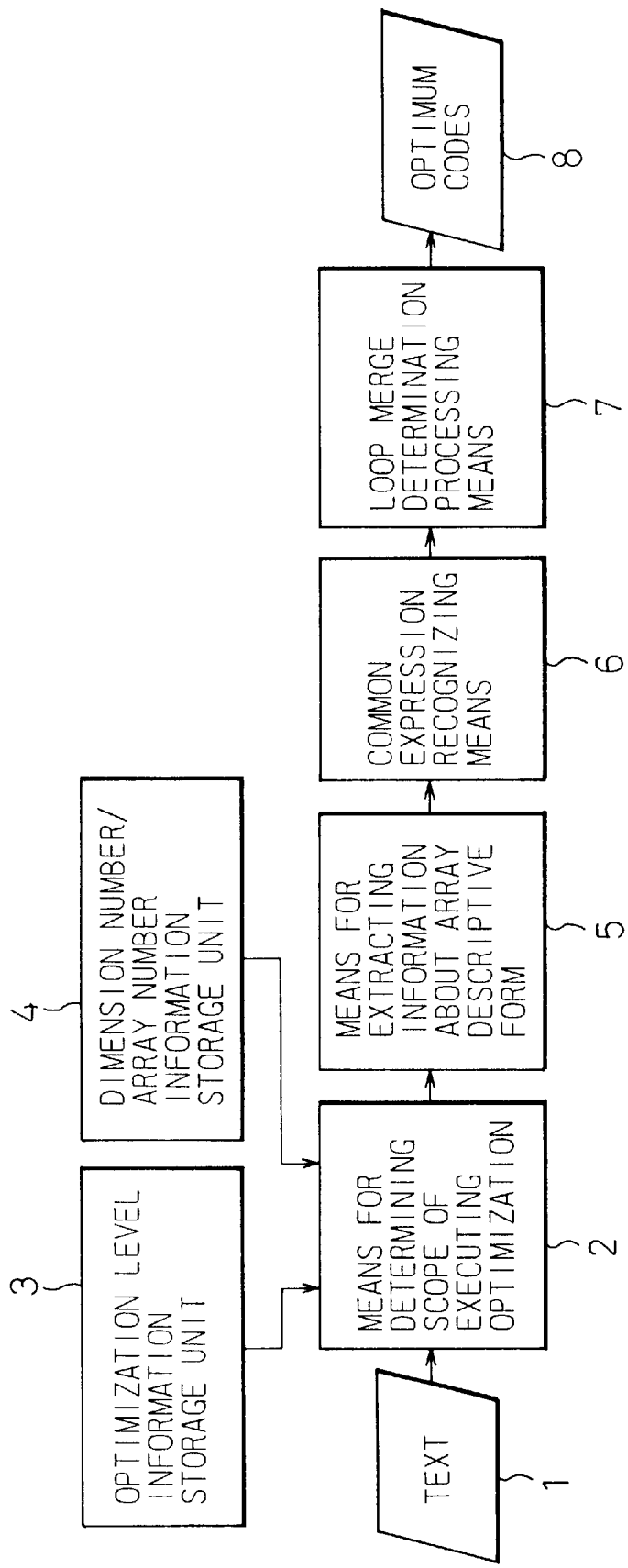
FIG. 1 is a block diagram showing the construction of a basic embodiment on the basis of the principle of the present invention.

FIG. 1 is a block diagram showing the construction of a basic embodiment based on the principle of the present invention.

An optimization control apparatus for array description according to the basic embodiment of the present invention shown in FIG. 1 includes a means 2 for determining the scope of executing an optimization which judges the scope of execution of optimization for a plurality of array descriptions on the basis of an optimization level determined in advance, the dimension number of the array of a plurality of array descriptions, and the array number of each dimension when a text 1 used as an input is read and optimum code generation is executed for a plurality of array descriptions consisting of statements operating the array of this text 1. The optimum codes 8 can be generated within the scope of executing an optimization judged by this means 2 for determining the scope of executing an optimization. In this case, the optimization level is preferably stored in an optimization level information storage unit 3, and the dimension number of the array of a plurality of array descriptions and the array number of each dimension are stored in a dimension number/array number information storage unit 4.

Further preferably, the embodiment shown in FIG. 1 includes a means 5 for extracting information about an array description form which extracts information representing the respective forms of a plurality of array descriptions within the scope of executing the optimization described above. The information extracted by this means 5 for extracting information about the array description form is stored in the list form.

Further preferably, the embodiment shown in FIG. 1 includes a common expression recognizing a means 6 for detecting a common expression for each array description from the information of the list form for expressing the forms of a plurality of array descriptions and recognizing common information for each array description.

Further preferably, the embodiment shown in FIG. 1 includes a loop merge determination processing means 7 for executing a loop merge judgement process as to whether or not a loop merge for converting each array description, whose form is defined at the time of execution, should be converted to an optimum loop during a generation of the optimum code on the basis of the results detected by the common expression recognizing means 6.

The basic embodiment for accomplishing the optimization control of the array description according to the present invention shown in FIG. 1 utilizes the rule that the left side of the array description must have the forms which are matched with the form in the right side for the data elements directed to the operations of the array descriptions comprising a novel language specification such as FORTRAN 90, etc., when the shape of the loop is judged, and can thus enlarge the scope in which the coincidence of the forms can be recognized. In this way, the execution of a loop merge becomes possible even in the case in which a loop merge has been impossible in accordance with the prior art methods represented by the afore-mentioned Expression No. 3.

In the embodiment shown in FIG. 1, further, the scope in which an optimization is executed is dynamically decided on the basis of the optimization level, the dimension number of the array of the array descriptions and the array number of each dimension (that is, the complicatedness of the expression) in consideration of the load and the effect of the loop merge process. According to such a process and such a technique, a translation work zone, the translation time, and the execution time corresponding to the optimization level can be accomplished.

In the embodiment shown in FIG. 1, the expression capable of expressing the form of the loop in a more simplified form is selected from among the subscript expressions of the arrays, which are used also for the judgement of the loop merge in order to express in the more simplified form the form of the loop (the initial value and the end value of the number of rotations of the loop, etc.) after loop expansion of the array descriptions. By means of the above-mentioned process, loop expansion of the optimum array descriptions depending on the optimization level can be accomplished.

A more detailed explanation will be given next. In the source program represented by the afore-mentioned Expression No. 3, for example, it will be assumed that each form of the array descriptions is determined from the left side of the assignment statements of the input text.

the form of the array assignment statement of the portion (1) of Expression No. 3 is uni-dimensional and the number of elements is L;

the form of the array assignment statement of the portion (2) of Expression No. 3 is uni-dimensional and the number of elements is M−1;

the form of the array assignment statement of the portion (3) of Expression No. 3 is uni-dimensional and the number of elements is N−2.

On the other hand, when each form of the array descriptions is determined from the right side of the array assignment statements:

the form of the array assignment statement of the portion (1) of Expression No. 3 is uni-dimensional and the number of elements is M−1;

the form of the array assignment statement of the portion (2) of Expression No. 3 is uni-dimensional and the number of elements is N−2;

the form of the array assignment statement of the portion (3) of Expression No. 3 is uni-dimensional and the number of elements is K.

Therefore, a coincidence of the forms cannot be judged from the information about only the right side of the array, descriptions, or only the left side of the array descriptions, and the loop merge cannot be executed. According to the stipulation of the language specification, however, data used as the object of operations must have the forms which are matched with each other between the right side and left side of the array descriptions (that is, coincidence of the dimension number of the array of the array description, and the element number of each dimension). Therefore, it is possible to derive:

L=M−1 from the array assignment statement in the portion (1) of the Expression No. 3;

M−1=N−2 from the assignment statement in the portion (2);

N−2=K from the array assignment statement in the portion (3);

L=M−1=N−2=K

As a result, the loop merge of (1), (2) and (3) of the Expression No. 3 becomes possible. A recognition of the common expression utilizing the language specification described above and the loop merge will be represented in further detail by the following Expression No. 4:

| Expression No. 4 |
| --- |
| Recognition of common expression utilizing language specification and loop merge: <br> ↓ <br> REAL(KIND = 4) A(10), B(10), C(10) <br> DO I = 1, L <br> A(I) = B(I + 1) <br> B(I + 1) = C(I + 2) <br> C(I + 2) = A(I) <br> ENDDO <br> END |

Next, the reason why the process capable of accomplishing the translation work area, the translation time, and the execution time corresponding to the optimization level by dynamically deciding the scope of executing an optimization from the optimization level and complicatedness of the Expression is added, will be explained. (By the way, the expressions for deciding practically the scope of executing an optimization on the basis of the theory explained hereby will be described later)

Generally, when the dimension number is M, the statement number is L (L≧2), and the number of the array of the i-th statement i (i=1, 2, . . . , L) is Ni, a coincidence judgement of the forms of statement 1 and statement 2 must be conducted $$M \times (N_1 \times N_2) \text{ (times)},$$

the coincidence judgement of the forms of statements 1 to 3 must be conducted $$M \times (N_1 + N_2) \times N_3 \text{(times)},$$

and the coincidence judgement of statements 1 to L-1 and statement L must be conducted $$M \times (N_1 + N_2 + \ldots N_{L-1}) \times N_L.$$

When the coincidence judgement of the forms is conducted for all the array descriptions of the statement number L, the number of times of the coincidence judgement of the forms required is the sum of the number of times of all the coincidence judgements of the forms, and it can be expressed by the following Expression No. 5:

$$M \times \sum_{i=2}^{L} \left( N_i \times \sum_{j=1}^{i-1} N_j \right) \qquad \text{Expression No. 5}$$

Assuming hereby that complicatedness of the statement is equal ($N_1=N_2=\ldots N_L=N$), the necessary number of times of the coincidence judgement of the forms can be expressed by the following Expression No. 6:

$$M \times N^2 \times \frac{L \times (L-1)}{2} (L \geq 2) \qquad \text{Expression No. 6}$$

In other words, the coincidence judgement operations must be carried out the number of times of the coincidence judgement of the forms represented by Expression No. 6.

This means that the translation time increases in the order of square, with respect to both of N representing complicatedness of the expression and L representing the statement number of the array descriptions used as the object of analysis. It can be seen from Expression No. 5 given above that in order to effectively utilize the translation resources, the translation time, and the translation work area, it is necessary to judge the complicatedness of the expressions and to dynamically judge the scope of executing an optimization. On the other hand, it is quite naturally possible to accomplish a loop merge of a higher level and to shorten the execution time by utilizing more translation resources. Nonetheless, since the translation resources are limited in practice, the translation resources cannot be always utilized unlimitedly.

Figure 2:
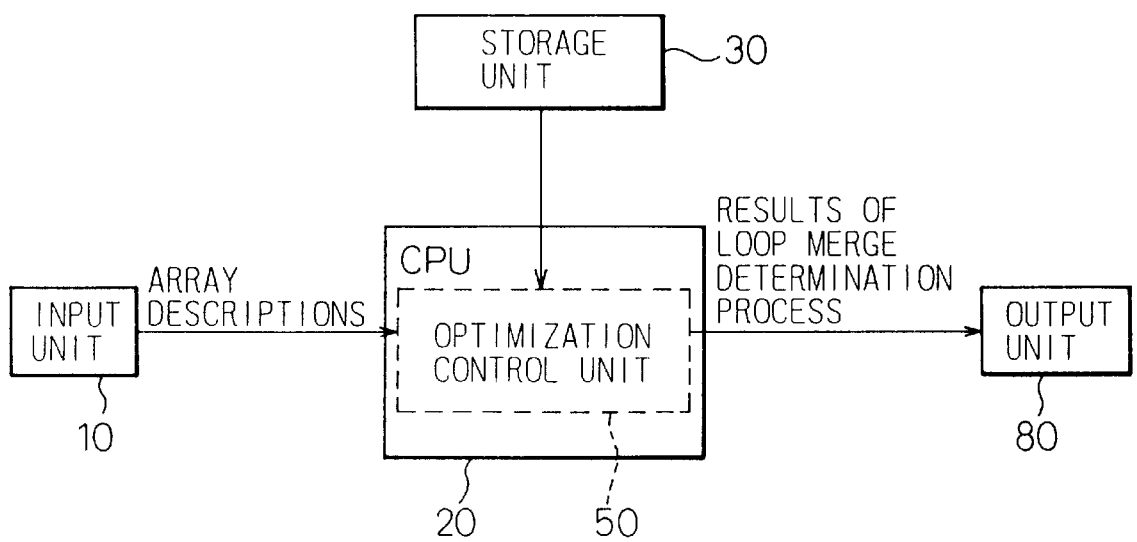
FIG. 2 is a block diagram showing the construction of a preferred embodiment for accomplishing an optimization control of the present invention.

FIG. 2 is a block diagram showing the construction of a preferred embodiment for accomplishing an optimization control according to the present invention. The drawing represents the case, as a typical example, where the optimization control apparatus according to the present invention is constituted by a computer system equipped with a CPU (Central Processing Unit). Incidentally, like reference numerals will be used hereinafter to denote like constituent elements as those described already.

In FIG. 2, an optimization control unit 50 including the means 2 for determining the scope of executing optimization, the means 5 for extracting information about the array descriptive form, the common expression recognizing means 6, and the loop merge determination processing means 7 described above can be realized by the CPU 20 of the computer system.

Further, the optimization level information storage unit 3 and the dimension number/array number information storage unit 4 are stored in advance in a storage unit 30 such as a RAM or a ROM provided to the CPU 20 shown in FIG. 2. The RAM or ROM built in the CPU 20 can be used as the storage unit 30, too.

In FIG. 2, further, the input unit 10 reads the text 1 as the object of input (see FIG. 1). A plurality of array descriptions consisting of statements for operating the array of the text 1 are inputted to the CPU 20.

In FIG. 2, further, the loop merge judgement process is executed inside the CPU 20, and generates the optimum codes (i.e., optimized codes) 8 subjected to optimization control (see FIG. 1). These optimum codes 8 are outputted from an output unit 80.

As can be obviously understood from the embodiment shown in FIG. 2, the functions of the present invention, such as judgement of the scope of executing optimization, extraction of the information about the array descriptive form, recognition of the common expression, judgement of loop merge, and so forth, can be readily accomplished by utilizing existing computer systems.

Figure 3:
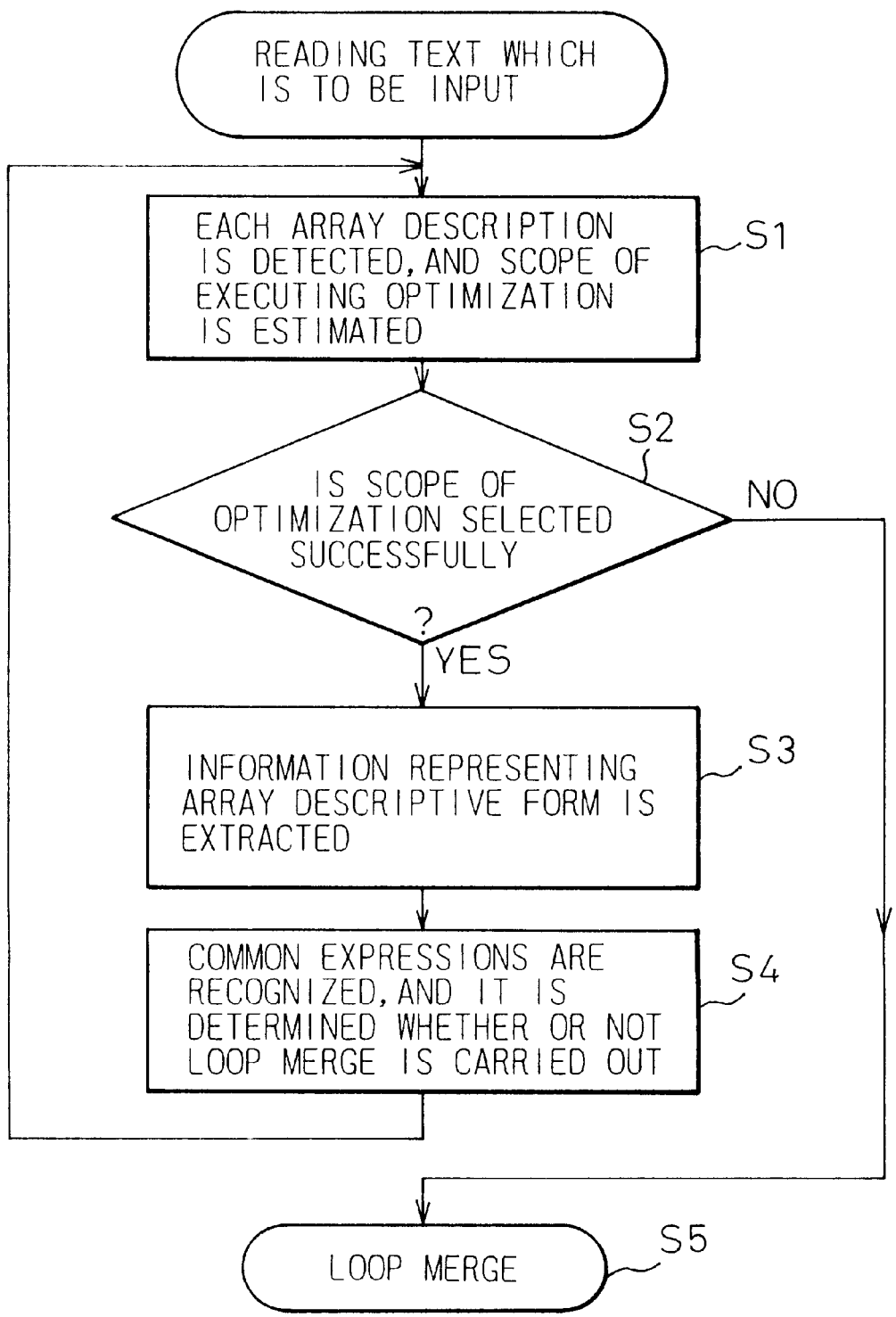
FIG. 3 is a flowchart useful for explaining the schematic operations of the preferred embodiment of the present invention.

FIG. 3 is a flowchart useful for explaining the schematic operations of the embodiment of the present invention.

At the step S1 (that is, the first phase) shown in FIG. 3, the text used as the input object is read, the array descriptions constituting this text are detected and the scope of executing an optimization is estimated. This step decides the matter as to from which portion of the text to which portion of the text is to be subjected to the optimization process. The text used as the input in the optimization process according to the present invention is a source program in the case of a preprocessor system, and is an intermediate code in the case of a compiler utilizing an intermediate language.

At the next step S2, the scope of executing an optimization, which is determined at the step SI, is selected and taken out. The scope of executing an optimization taken out in this way is effective, unless jumping in from any other statement or jumping out to any other statement exists.

Further, when the scope of executing the optimization described above is judged as effective, an extraction process of the information expressing each form of the array descriptions is executed at the step S3 (that is, the second phase).

Further, when the scope of executing the optimization described above is judged as effective, a list is prepared for the information taken out at the step S3, and is registered, at the step S4. At the same time, a merge process of the same data is executed, and a recognition of the common expression and a judgement of the loop merge are conducted. When the first process and the third phase process are executed, the calculation formula concerning each form of the array descriptions can be obtained by the same expression, and a coincidence judgement of the forms becomes possible. As a result, the loops which have not been merged by conventional means, can be merged at the step S5. Furthermore, it becomes possible to express the initial value, the final value and the increment value of the loop at the time of a loop expansion by a more simplified expression. The first to third phases described above will be explained later in further detail with reference to the FIGS. 4 to 11 that will be mentioned later.

Figure 4:
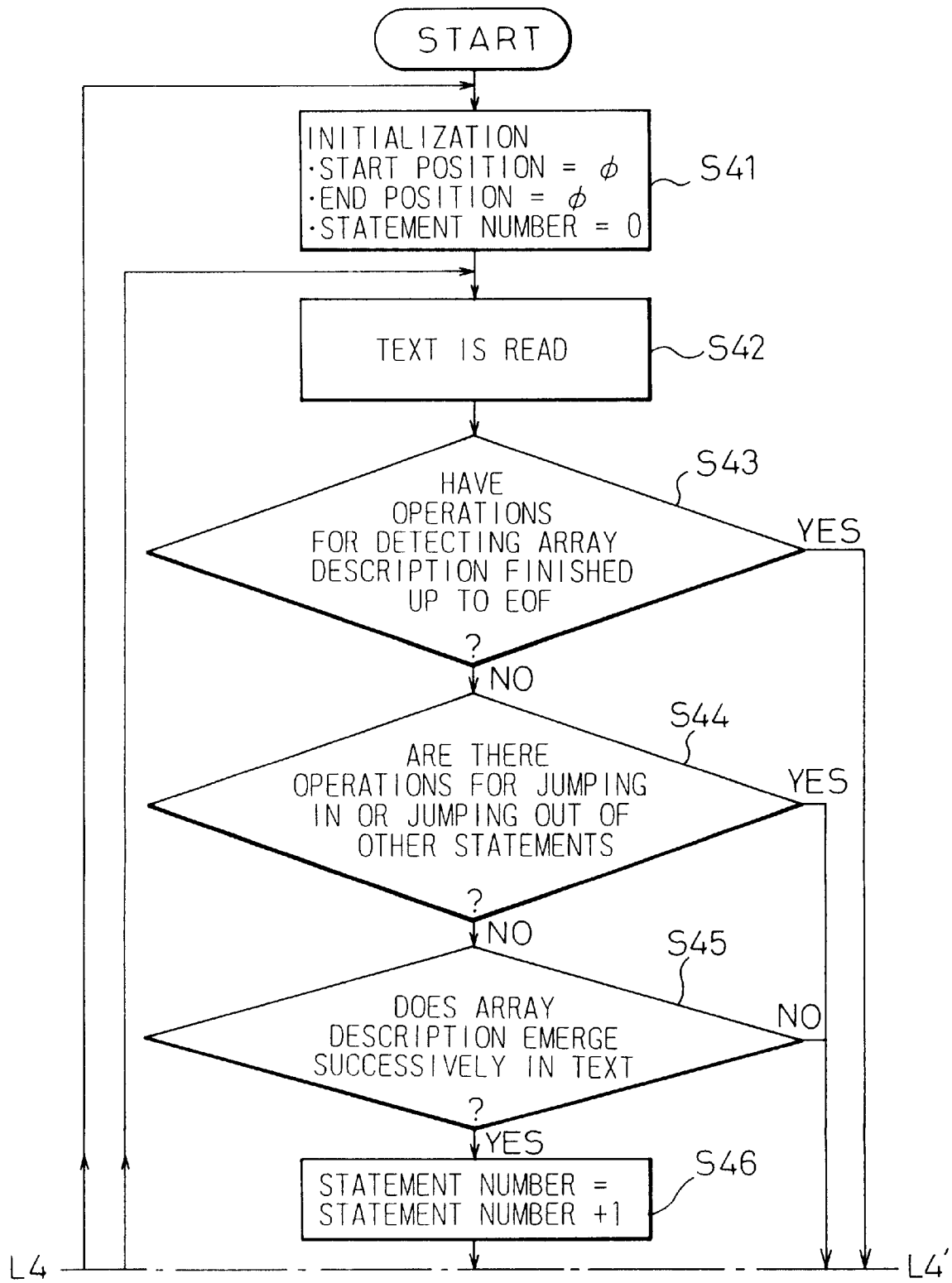
FIG. 4 is a flowchart useful for explaining the detail of the former half portion of the processing procedures for detecting the array descriptions and for estimating the scope of executing the optimization.
Figure 5:
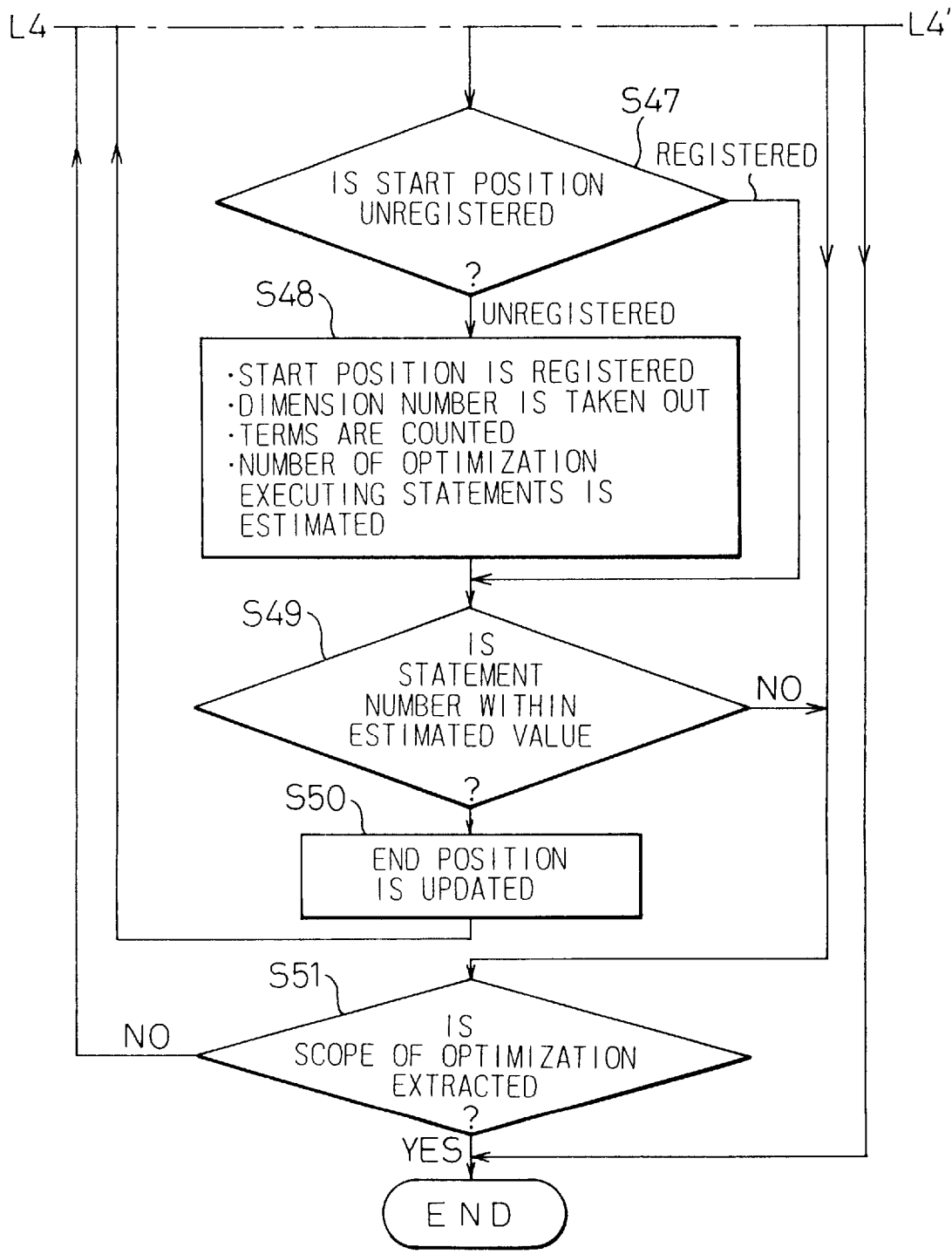
FIG. 5 is a flowchart useful for explaining the detail of the latter half portion of the processing procedures for detecting the array descriptions and for estimating the scope of executing the optimization.

FIGS. 4 and 5 are flowcharts of the former half portion and the latter half portion of the processing procedures for detecting the array descriptions in FIG. 3 and estimating the scope of executing an optimization, respectively. Here, the explanation will be given on the first phase (step S1 in FIG. 3) of the optimization process of the array descriptions.

In this first phase process, the start position (for example, φ) of the array description, the end position (for example, φ) and the statement number (for example, 0) are initially set at first at the step S41 so as to initialize the optimization control unit (for example, the CPU). At the next step S42, the text used as the input is read and the array descriptions are detected. The text used as the input is the source program in the case of a preprocessor system and is an intermediate code in the case of a compiler utilizing an intermediate language.

The detecting operation of the array descriptions described above is continued until the end position of a file (EOF) is reached (step S43).

Further, whether or not jumping in or jumping out of other statements exists is judged (step S45). Further, the statement number for executing an optimization, that is, the statement number of the array descriptions used as the object of analysis, is serially calculated on the basis of the optimization level and complicatedness of the expression (step S46).

Furthermore, at the step S47 in FIG. 5, it is judged whether or not the start position of the array descriptions of the text is unregistered.

If it is unregistered, a registration of the start position of the array descriptions, an extraction of the dimension number, a count of terms (for example, the number of arrays), and an estimation of the statement number for optimization are executed.

The end position of the array descriptions is updated within the scope of the statement number for optimization which is estimated as described above (steps S49 and S50), and then the range in which the array descriptions continuously appear and in which jumping-in jumping-out of other statements does not exist halfway, is determined. The range obtained in this way is finally extracted as the scope of executing an optimization (step S51).

In this case, it is known from the theory described with reference to the embodiment shown in FIG. 1, that the number of optimization executing statements can be calculated in accordance with the following Expression No. 7:

EXPRESSION NO. 7

Number of optimization executing statements $$=(\alpha \times OPT) \times (\beta/dim) \times (\gamma/item)^2$$

α: translation resource coefficient OPT: optimization level
β: reference dimension number dim: dimension number of array descriptions
γ: reference array number item: number of arrays that appears first in array descriptions.

In Expression No. 7 mentioned above, α is a translation resource coefficient.

This α represents the use increase ratio of the translation resource, the translation time and the translation work area, etc., per the optimization level. This value is decided by carrying out a tuning based on empirical rules.

β is a reference dimension number.

This β represents the dimension number that appears most frequently in the ordinary array descriptions. Since the β value is empirically known as β=3 in the calculation of numeric values using FORTRAN by the compiler, etc., it is set to 3.

γ is a reference array number.

This γ represents the term number that appears most frequently in the ordinary array descriptions. This value, too, is decided by carrying out tuning based on the empirical rules.

The term "OPT" represents the optimization level.

This OPT represents the degree of an optimization executed by the compiler, etc., by a numerical value of at least 1. The larger is this value, the higher is the level of an optimization executed. Higher execution performance can be accomplished at the sacrifice of the translation time and the translation area.

The term "dim" represents the dimension number of the array descriptions.

The larger is this "dim" value, the longer becomes the time necessary for the coincidence judgement of the forms. The processing time has a proportional relationship with respect to this "dim" value.

The term "item" represents the number of arrays that appears first in the array descriptions.

The larger is this "item" value, the longer becomes the time necessary for the coincidence judgement of the forms. Originally, the number of arrays is different from statement to statement, but the "item" value is determined from the array descriptions first appearing, on the assumption that the complicatedness of the expressions is substantially equal for each array description.

Figure 6:
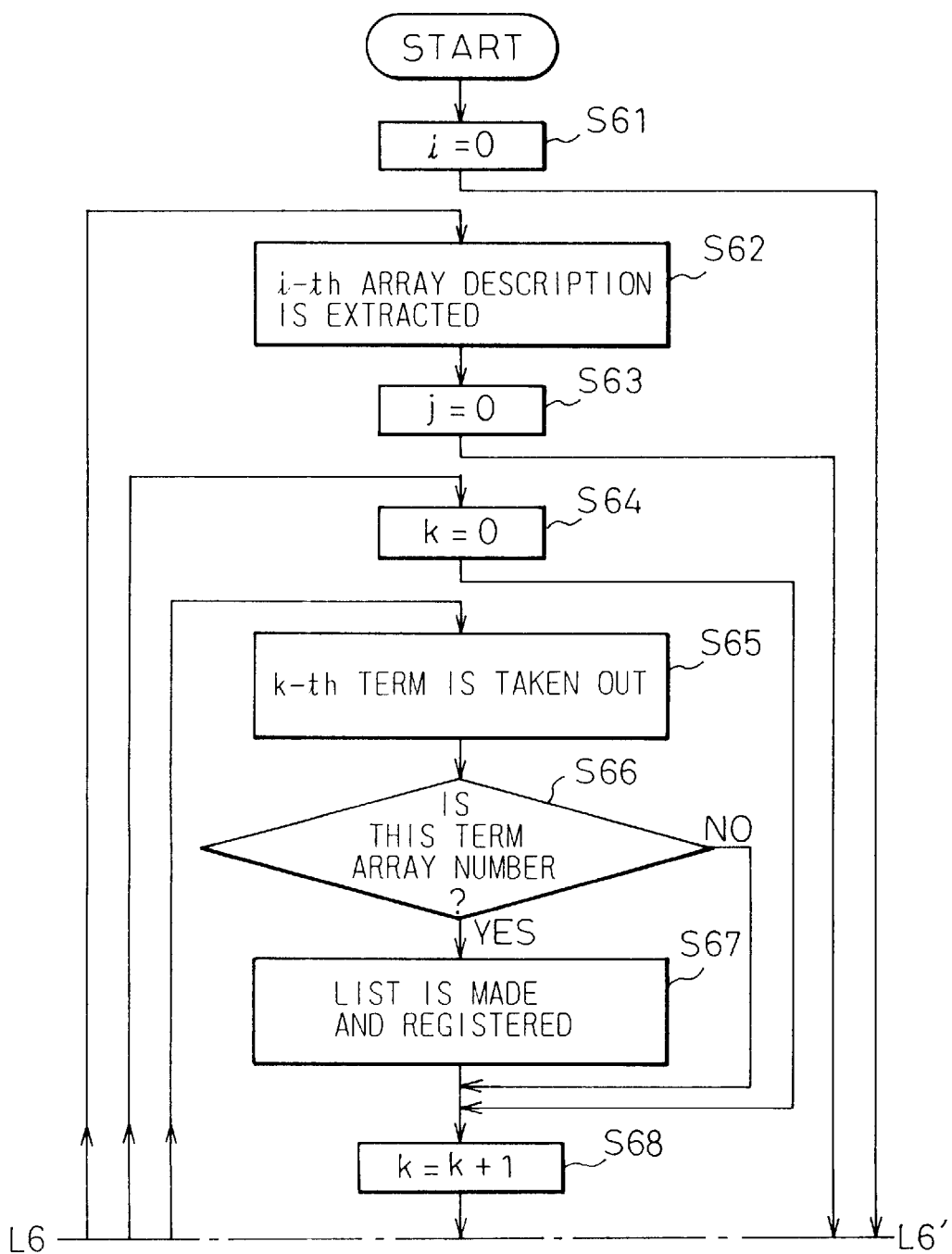
FIG. 6 is a flowchart useful for explaining the detail of the former half portion of the processing procedures for taking out the information representing each form of the array descriptions shown in FIG. 3.
Figure 7:
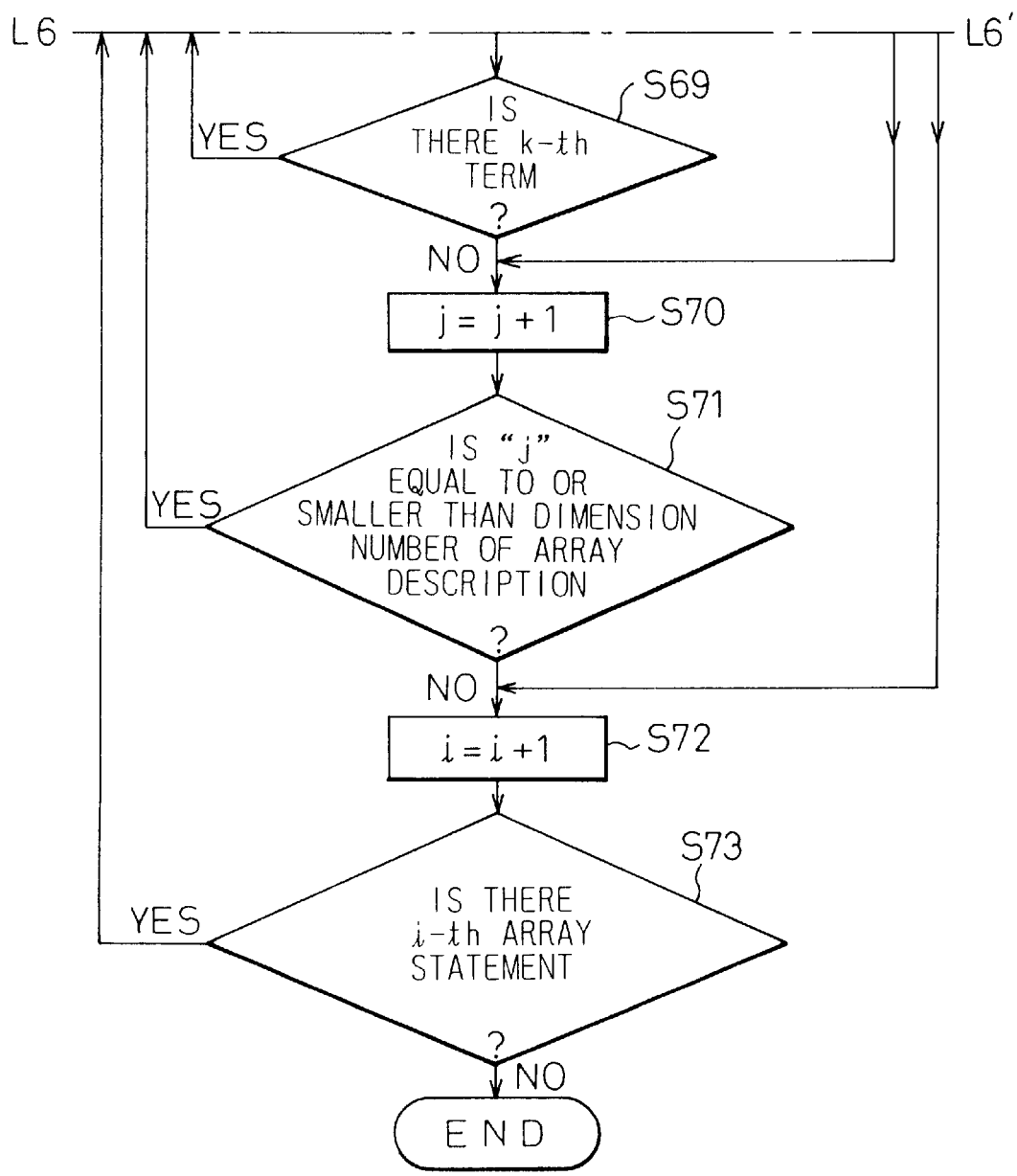
FIG. 7 is a flowchart useful for explaining the detail of the latter half portion of the processing procedures for taking out the information representing each form of the array description shown in FIG. 3.

FIGS. 6 and 7 are flowcharts useful for explaining in detail the former half and the latter half of the processing procedures for taking out the information representing each form of the array descriptions shown in FIG. 3, respectively. Here, the explanation will be given on the second phase (step S3 in FIG. 3) of the optimization process of the array descriptions.

In general, the process of this second phase is composed of the following two processing procedures a) and b).

a) Processing procedure for taking out information representing the element number from the array of the array descriptions within the scope of executing an optimization The element number of the same dimension inside the same array description has an equivalent value when the form matching is made between the right side and the left side of each array description. This processing procedure comprises a triple loop for continuously taking out the data having the equivalent value.

b) Processing procedure for making a list on the basis of information thus taken out and registering the list (see later-appearing FIG. 8)

Here, the same data in each array description is dealt with as common data, simultaneously with making of the list. In this processing procedure, an inquiry concerning existing lists is made at the time of making of the list so as to prevent making of the list having the same information. Further, the lists each representing the same value are merged at the time of the appearance of the list having the same information.

When the process of the second phase in the optimization process of the array descriptions is executed, the array descriptions are initialized by setting i value to zero (i=0) at the step S61 in FIG. 6. Next, at the step S73 in FIG. 7, the i value is increased by 1, and it is checked whether or not the i-th (i=i+1) array description exists. If the i-th array description exists, the i-th array description is taken out at the step S62 in FIG. 6 (the first loop in the triple loop).

Further, the dimension of the i-th array description is initialized by setting j value to zero (j=0) at the step S63. Next, the j value is increased by 1 (j=j+1) at the step S70 in FIG. 7, and it is checked whether or not the j value after this increase of the j value is smaller than the dimension number of the above array description. If the j value is smaller than the dimension number of the above array description, value k is set to zero (k=0) at the step S64 in FIG. 6 (the second loop in the triple loop).

Further, the k value is increased by 1 (k=k+1) at the step S68, and it is checked whether or not the k-th term exists is checked at the step S69 in FIG. 7. If the k-th term exists, the k-th term is taken out at the step S65 in FIG. 6 (the third loop in the triple loop). Further, after it is confirmed that this term is the array number (step S66), a list is made concerning the information corresponding to the term thus taken out and this list is registered (step S67). In other words, the present invention can continuously take out the data whose value for representing the form of each array description is an equivalent value, by adopting the triple loop structure. This processing procedure for making and registering the list relating to the information taken out in this way and representing the form of each array description can be continued until respective values of i, j and k reach the predetermined values.

Figure 8:
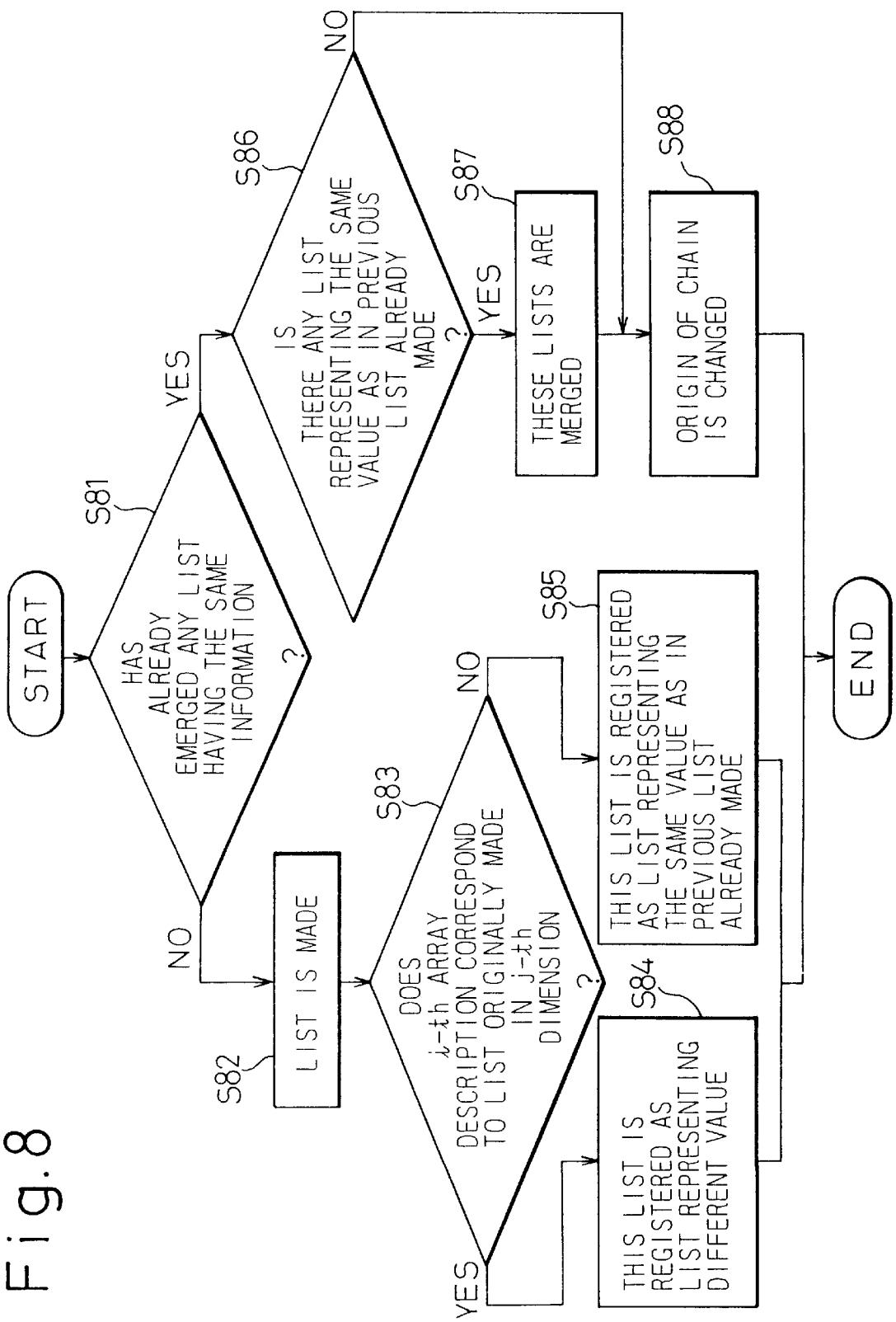
FIG. 8 is a flowchart useful for explaining the detail of the processing procedures for making and registering a list in FIG. 6.

FIG. 8 is a flowchart useful for explaining in detail the processing procedures for making and registering the list shown in FIG. 6.

To begin with, it is checked whether or not the list having the same information has already existed at the step S81 in FIG. 8. When the list of this kind does not exist, a list is made afresh (step S82), and it is checked whether or not the i-th array description is the one that corresponds to the list first made in the j-th dimension (step S83). If the i-th array description is the array description that corresponds to the list originally made in the j-th dimension, the above array description is registered as the list representing different value which is different from that in the list previously made (step S84).

If the i-th array description is not the array description that corresponds to the list originally made in the j-th dimension (step S83), the above array description is registered as a list representing the same value as the list previously made (step S85).

On the other hand, if the list having the same information has already emerged (step S81), it is checked whether or not the list representing the same value as the value previously made exists at the step S86. If the list representing the same value as the list previously made exists, the same data are merged, simultaneously with making of this list. Making of the list having the same information can be prevented by making an inquiry concerning the existing lists. Further, the list representing the same value are merged when the list having the same information appears (step S87). On the other hand, when the list representing the same value as the one previously made does not exist at the step S86, the origin of the chain is changed by judging that the existing lists representing the same value do not exist (step S88), and a list is made afresh.

Figure 9:
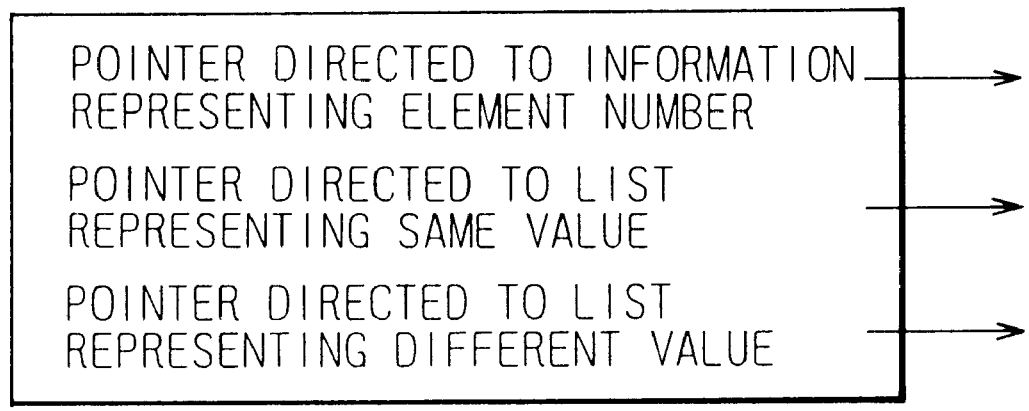
FIG. 9 is a diagram showing an example of the list structure made or registered by the processing procedures shown in FIG. 8.

FIG. 9 shows an example of the list structure made or registered by the processing procedure shown in FIG. 8; and FIG. 10 shows an example of the list structure made by the source text input.

FIG. 9 shows three pointers used for making the list. These three pointers include a pointer directed to the information representing the element number, a pointer directed to the list representing the same value, and a pointer directed to the information representing the different value.

As shown in FIG. 10, further, the pointers described above function in the list structure made by the source text input.

When the relationship concerning the element number, that is, the element number L=M−1 N−2, and I=J, is represented, for example, L, M−1 and N−2 are expressed in the chain form by using the pointer for the list representing the same value as is obvious from the list structure shown in FIG. 10, and I and J, too, are expressed in the chain form by using the pointer for the list representing the same value. On the other hand, L and I are expressed by using the pointer for the information representing the different value.

Next, the judgement process for recognition of the common expression and a loop merge, which is defined as the third phase of the optimization process of the array descriptions (step S4 in FIG. 3), will be explained in detail. This third phase is executed by the following processing procedures (A) to (C):

group having the equal value of the expressions is obtained from the list thus made;

(B) the simplest expression is selected from among this group to substitute for other expressions; and (C) as a result, the calculation expression of the forms of the array descriptions can be obtained by the same expression, and the coincidence judgement of the forms can be executed.

According to such processing procedures, the loop which has not been able to be merged according to the prior art can be merged. Further, the initial value of the loop, its final value and its increment value at the time of loop expansion can be expressed by a more simplified expression.

FIG. 11 is a block diagram showing a concrete example for accomplishing the optimization control according to the present invention. This drawing illustrates the optimization control apparatus of the present invention in a more concrete construction than the embodiment shown in FIG. 2.

Further, in FIG. 11, the CPU comprises a front-end processor 21 and an optimization back-end processor (OBE) 23. The front-end processor 21 mainly executes a syntax analysis or the like. On the other hand, the optimization back-end processor 23 inclusive of the optimization control unit 25 mainly executes recognition of the common expression within the scope of executing an optimization and a loop merge judgement process.

The input unit 11 and the output unit 81 shown in FIG. 11 substantially correspond to the input unit 10 and the output unit 80 shown in FIG. 2, respectively.

The source text comprising the language specification such as FORTRAN inputted to the input unit 11 of the optimization control apparatus shown in FIG. 11 is the source program in the case of the preprocessor system, and is the intermediate code in the case of the system utilizing the intermediate language. The codes comprising the language specification such as the C language, FORTRAN 77, etc., are outputted from the output unit 81 in the case of the former preprocessor system. In the case of the latter system utilizing the intermediate language, the codes comprising the intermediate language are outputted from the output unit 81. In the optimization control apparatus of the present invention shown in FIG. 11, therefore, the optimization process inclusive of a recognition of the common expression, a loop merge judgement process, etc., can be executed for both of the source program and the intermediate language.

As described above, the optimization control apparatus for the array description according to some preferred embodiments of the present invention estimates, in the first place, the scope of executing optimization relating to a plurality of array descriptions on the basis of the level of the optimization determined in advance, the array number, and the dimension number of the arrays of a plurality of array descriptions, when optimum codes are generated for a plurality of array descriptions. Therefore, the translation time, the translation work area, and the execution time corresponding to the optimization level can be set. As a result, the optimum codes depending on the optimization level given by the user can be generated for the array descriptions inherent to FORTRAN 90, etc., and this invention greatly contributes to the improvement in performance of the compiler, etc.

The optimization control apparatus for the array description according to the preferred embodiments of the present invention extracts, in the second place, the information representing the forms of a plurality of array descriptions within the scope of executing the optimization, and stores the information so extracted in the list form. Therefore, the present invention can enlarge the range in which a coincidence of the forms is recognized on the basis of this kind of information, and a loop merge, which has not been carried out in the prior art, can be carried out, so that the execution time can be shortened.

The optimization control apparatus for the array description according to the preferred embodiments of the present invention detects, in the third place, the common expression for each array description from the information in the list form for expressing the form of a plurality of array descriptions and recognizes the information common to each array description. Therefore, the translation work area, the translation time, and the execution time corresponding to the optimization level can be accomplished without wasting the translation resources or without making the expression inside each array description complicated.

The optimization control apparatus for the array description according to the preferred embodiments of the present invention executes, in the fourth place, the loop merge judgement process as to whether or not loop merge for converting each array description, whose form is defined at the time of execution, to the optimum loop during a generation of the optimum codes, and can therefore represent the form of the loop after a loop expansion in a more simplified form. As a result, the execution time can be shortened.

The optimization control apparatus for the array description according to the preferred embodiments of the present invention selects, in the fifth place, the form of the optimum loop from the information stored in the list form as described above when each array description is converted to the loop. Therefore, the apparatus selects the expression capable of representing the loop form in a more simplified form from among the subscript expressions used also for the judgement of a loop merge, and loop unrolling of the optimum array description is accomplished.

On the other hand, the optimization control method for the array descriptions according to some preferred embodiments of the present invention estimates, in the first place, the scope of executing an optimization for a plurality of array description on the basis of the level of optimization determined in advance, the dimension number of a plurality of array descriptions and the array number of each dimension when the optimum codes are generated for a plurality of array descriptions. Therefore, the translation time, the translation work area, and the execution time corresponding to the optimization level can be accomplished. As a result, the optimum codes depending on the optimization level given by the user can be generated for the array descriptions inherent to FORTRAN 90 and so forth.

The optimization control method for the array description according to the preferred embodiments of the present invention extracts, in the second place, the information representing the forms of a plurality of array descriptions within the scope of executing the optimization described above, and stores the information so extracted in the list form. Therefore, this method can enlarge the range in which a coincidence of the forms can be recognized on the basis of this kind of information. Accordingly, a loop merge can be executed even in the case in which the loop merge has not be able in the past, and the execution time can be shortened.

The optimization control method for the array description according to the preferred embodiments of the present invention detects, in the third place, the expression common to each array description from the information in the list form for representing the form of a plurality of array descriptions, and recognizes the information common to each array description. Therefore, the translation work area, the translation time and the execution time can be accomplished without sacrificing the translation resources or making the expression inside each array description complicated.

The optimization control method for the array description according to the preferred embodiments of the present invention executes, in the fourth place, the loop merge judgement as to whether or not a loop merge for converting each array description, whose form is defined at the time of execution, to the optimum loop is to be executed when the optimum codes are generated. Therefore, this method can represent the form of the loop in a more simplified form after a loop expansion of the loop of the array descriptions. As a result, reduction of the execution time can be promoted.

The optimization control method for the array description according to the preferred embodiments of the present invention selects, in the fifth place, the optimum loop form from the information stored in the list form described above when each array description is converted to the loop. Therefore, this method selects the expression capable of representing the loop form in a more simplified form from the subscript expressions of the array used also for the loop merge judgement, and the loop expansion of the optimum array description depending on the optimization level can be accomplished.

In short, the preferred embodiments of the present invention can merge the loops, which has not been possible in the past, by utilizing a novel language specification such as FORTRAN 90, or the like. Further, the present invention can accomplish the translation time, the translation work area, and the execution time corresponding to the optimization level by dynamically deciding the scope of executing the optimization from the optimization option and the complicatedness of the expression. The present invention can further set the optimum loop form for the initial value, the final value and the increment value at the time of expansion of the loop to which the loop merge is applied. Accordingly, the optimum codes depending on the optimization level given by the user can be generated for the array descriptions inherent to FORTRAN 90, and the present invention can therefore greatly contribute to the improvement in performance of the compiler, and so forth.

What is claimed is:

1. An optimization control apparatus for reading an input and generating optimum codes for a plurality of array descriptions having different subscript expressions, comprising:

means for determining a scope of executing an optimization for said array descriptions, and deriving relations between said different subscript expressions of array descriptions on the basis of an optimization level determined in advance, the dimension number of an array of said array descriptions, and the array number of each dimensions;

means for outputting said optimum codes within the scope of executing the optimization judged by said means for determining the scope of executing the optimization;

means for extracting information about an array descriptive form which is for extracting the information representing each form of said array descriptions within said scope of executing the optimization, wherein the extracted information is stored in a list form; and common expression recognition means for detecting a common expression for each of said array descriptions from said information stored in the list form, and recognizing said information common to each of said array descriptions.

2. An optimization control apparatus as set forth in claim 1, wherein a loop merge determination process which determines whether a loop merge for converting said array descriptions to an optimum loop should be carried out is executed for said array descriptions on the basis of the results detected by said common expression recognition means.

3. An optimization control apparatus as set forth in claim 1, wherein said array descriptions are converted to said loop and an optimum loop form is selected from said information stored in said list form.

4. An optimization control method for reading an input and generating optimum codes for a plurality of array descriptions having different subscript expressions, comprising:

determining a scope of executing an optimization for said array descriptions, and deriving relations between said different subscript expressions of array descriptions on the basis of an optimization level determined in advance, the dimension number of an array of said array descriptions, and the array number of each dimension;

outputting said optimum codes within the scope of executing the optimization judged by said determining step;

extracting the information representing each form of said array descriptions within said scope of executing the optimization such that the information extracted by said extracting step is stored in a list form; and detecting a common expression for each of said array descriptions from said information stored in said list form and recognizing said information common to each of said array descriptions.

5. An optimization control method as set forth in claim 4, further comprising:

executing a loop merge determination process which determines whether a loop merge for converting said array descriptions to an optimum loop should be carried out for said array descriptions on the basis of the results of detection of said common expression.

6. An optimization control method as set forth in claim 4, further comprising:

selecting an optimum loop form from said information stored in said list form when said array descriptions are converted to a loop.

7. A computer readable storage medium for controlling a computer and including code for reading an input and generating optimum codes for a plurality of array descriptions having different subscript expressions, comprising:

code to determine a scope of executing an optimization for said array descriptions, and to derive relations between said different subscript expressions of array descriptions on the basis of an optimization level determined in advance, the dimension number of an array of said array descriptions, and the array number of each dimension;

code to output said optimum codes within the scope of executing the optimization;

code to extract the information representing each form of said array descriptions while executing said code to execute the optimization such that the information extracted by said code to extract the information is stored in a list form; and code to detect a common expression for each of said array descriptions from said information stored in said list form and recognizing said information common to each of said array descriptions.

* * * * *